United States Patent
Walters et al.

(10) Patent No.: US 11,824,850 B2
(45) Date of Patent: Nov. 21, 2023

(54) SYSTEMS AND METHODS FOR SECURING LOGIN ACCESS

(71) Applicant: Capital One Services, LLC, McLean, VA (US)

(72) Inventors: Austin Walters, Savoy, IL (US); Reza Farivar, Champaign, IL (US); Galen Rafferty, Mahomet, IL (US); Anh Truong, Champaign, IL (US); Vincent Pham, Champaign, IL (US); Mark Watson, Urbana, IL (US); Jeremy Edward Goodsitt, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 251 days.

(21) Appl. No.: 16/926,567

(22) Filed: Jul. 10, 2020

(65) Prior Publication Data
US 2022/0014509 A1    Jan. 13, 2022

(51) Int. Cl.
*H04L 29/06* (2006.01)
*H04L 9/40* (2022.01)
*H04L 67/50* (2022.01)

(52) U.S. Cl.
CPC ........ *H04L 63/083* (2013.01); *H04L 63/0876* (2013.01); *H04L 63/102* (2013.01); *H04L 63/20* (2013.01); *H04L 67/535* (2022.05)

(58) Field of Classification Search
CPC . H04L 63/083; H04L 63/0876; H04L 63/102; H04L 63/20; H04L 67/22
See application file for complete search history.

(56) References Cited

U.S. PATENT DOCUMENTS

| | | | |
|---|---|---|---|
| 7,975,292 B2 | 7/2011 | Corella | |
| 8,234,302 B1* | 7/2012 | Goodwin | H04L 63/126 726/28 |
| 9,021,269 B2 | 4/2015 | Spilman | |

(Continued)

OTHER PUBLICATIONS

Georgios Kontaxis et al., SAuth: Protecting User Accounts from Password Database Leaks, Nov. 2013, ACM, pp. 187-198. (Year: 2013).*

(Continued)

*Primary Examiner* — Luu T Pham
*Assistant Examiner* — Fahimeh Mohammadi
(74) *Attorney, Agent, or Firm* — TROUTMAN PEPPER HAMILTON SANDERS LLP; Christopher J. Forstner; John A. Morrissett

(57) ABSTRACT

The disclosed systems and methods may receive a first salted password having a first password, a first user device identifier, and a first browser identifier, extract the first password, the first user device identifier, and the first browser identifier from the first salted password, and determine whether the first password, the first user device identifier, and the first browser identifier respectively match a stored first password, a stored first user device identifier, and a stored first browser identifier. The systems may grant the request to access the one or more resources for the first user device or perform other actions depending on whether the first password, the first user device identifier, and the first browser identifier respectively match the stored first password, the stored first user device identifier, and the stored first browser identifier.

20 Claims, 6 Drawing Sheets

(56) References Cited

U.S. PATENT DOCUMENTS

| | | | |
|---|---|---|---|
| 9,565,090 B1* | 2/2017 | Maykov | H04L 67/53 |
| 9,755,834 B1* | 9/2017 | Johnson | H04L 9/3234 |
| 10,375,563 B1* | 8/2019 | Bellam | H04L 63/104 |
| 10,510,465 B1* | 12/2019 | Costa | H02G 1/10 |
| 2007/0006305 A1 | 1/2007 | Florencio et al. | |
| 2008/0162338 A1* | 7/2008 | Samuels | G06F 21/40 705/42 |
| 2009/0006861 A1* | 1/2009 | Bemmel | H04L 63/083 713/189 |
| 2013/0198834 A1* | 8/2013 | Kirsch | H04L 63/0823 726/17 |
| 2014/0101446 A1 | 4/2014 | Lekies et al. | |
| 2015/0067804 A1* | 3/2015 | Maxwell | H04L 51/48 726/7 |
| 2015/0310194 A1* | 10/2015 | Zhang | G06F 21/31 726/9 |
| 2016/0330178 A1* | 11/2016 | Sprague | H04L 63/0876 |
| 2017/0068964 A1* | 3/2017 | Gevka | G06Q 30/0277 |
| 2017/0171187 A1* | 6/2017 | Yin | H04L 63/083 |
| 2017/0317828 A1* | 11/2017 | Reinhold | G06F 21/46 |
| 2017/0346821 A1* | 11/2017 | Yedidi | H04L 63/0876 |
| 2017/0351733 A1* | 12/2017 | Zhou | G06F 21/6254 |
| 2020/0007607 A1* | 1/2020 | Maxilom | H04W 76/15 |
| 2020/0412717 A1* | 12/2020 | Puertas Calvo | H04L 63/1433 |

OTHER PUBLICATIONS

Kurt Thomas et al., Data Breaches, Phishing, or Malware? Understanding the Risks of Stolen Credentials, Oct. 2017, ACM, pp. 1421-1434. (Year: 2017).*

Eric Grosse et al., Authentication at Scale, Jan.-Feb. 2013, IEEE, vol. 11, Issue: 1, pp. 15-22. (Year: 2013).*

Arun Cyril Jose et al., Improving Home Automation Security; Integrating Device Fingerprinting Into Smart Home, Sep. 8, 2016, IEEE, pp. 5776-5787. (Year: 2016).*

Extended European Search Report in related EP Application No. EP21184627.4, dated Nov. 19, 2021.

* cited by examiner

SYSTEMS AND METHODS FOR SECURING LOGIN ACCESS

FIELD OF INVENTION

The present disclosure relates to salting a password entered on a user device with a browser identifier and/or a user device identifier for security purposes and an authentication system extracting a password, a browser identifier, and a user device identifier from the salted password received from the user device so that the authentication system can determine whether to grant access to the user device or perform other actions in addition to or in place of granting access.

BACKGROUND

Businesses of all sizes want to secure their networks and confidential data from unauthorized access and use. Similarly, financial service providers (e.g., banks, credit card companies, etc.) and other customer facing organizations want to secure their networks and their clients' confidential data from unauthorized access and use for liability reasons and to maintain the trust of their clients to maintain and even gain their client base. Such customer facing organizations typically require users (e.g., customers, employees, administrators) to pre-register a user name and password and then to enter that registered user name and password to access their network, software application, or other data. If the user enters a wrong user name or password, an authentication system of the customer facing organization and/or of a third party retained by the organization rejects the login attempt. While requiring a user name and password prior to granting access to a network, software application, or other data provides some level of security, hackers or phishers may obtain a user's user name and password and access a network, software application, or other data. If the hackers or phishers obtain a user's user name and password associated with a financial service provider, they could empty a user's financial account(s).

To step up security and to prevent hackers and phishers from accessing businesses', networks, software applications, or other data, some networks employ two-factor authentication where a user registers an email along with a user name and password. In one example, when a user, hacker, or phisher enter the correct user name and password to access a network, software application, or other data, the authentication system sends an email or a text to the user's registered email providing a code that must be entered on a website (internal or public) before the authentication system will grant access to a network, software application, or other data. While two-factor authentication provide an added layer of security above a simple user name and password, hackers or phishers could obtain access to a user's email allowing them to access a network, software application, or other data.

Accordingly, there is a need for improved systems and methods to secure login and authentication processes. Embodiments of the present disclosure are directed to this and other considerations.

SUMMARY

Disclosed embodiments provide systems and methods for salting a password entered on a user device with a browser identifier and/or a user device identifier for security purposes and an authentication system extracting a password, a browser identifier, and a user device identifier from the salted password received from the user device so that the authentication system can determine whether to grant access to the user device or perform other actions in addition to or in place of granting access.

The system may include one or more processors and a memory in communication with the one or more processors and storing instructions that when executed by the one or more processors, are configured to cause the system to perform steps of a method. The method may include receiving, from a first browser of a first user device associated with a user, a request to access one or more resources. The request includes a first salted password and the first salted password include a first password, a first user device identifier, and a first browser identifier, retrieving a stored first password, a stored first user device identifier, and a stored first browser identifier, extracting the first password, the first user device identifier, and the first browser identifier from the first salted password, respectively comparing the first password, the first user device identifier, and the first browser identifier to the stored first password, the stored first user device identifier, and the stored first browser identifier, determining whether the first password, the first user device identifier, and the first browser identifier respectively match the stored first password, the stored first user device identifier, and the stored first browser identifier beyond a predetermined threshold. The method may also include granting the request to access the one or more resources for the first user device when the first password, the first user device identifier, and the first browser identifier respectively match the stored first password, the stored first user device identifier, and the stored first browser identifier beyond the predetermined threshold. The method may also include performing one or more actions (e.g., denying access and/or uninstalling a browser on the first user device) when the first password, the first user device identifier, or the first browser identifier do not respectively match the stored first password, the stored first user device identifier, or the stored first browser identifier beyond the predetermined threshold.

The user device may include one or more processors and a memory in communication with the one or more processors and storing instructions that when executed by the one or more processors, are configured to cause the user device to perform steps of a method. The method may include navigating a first browser to a login page for a website, receiving a first password inputted by a user of the user device via the first browser at the website, retrieving a user device identifier and a first browser identifier, and generating a first salt based on the user device identifier and the first browser identifier. The method may include applying the first salt to the first password to generate a first salted password without displaying an indication to the user device that the first salt was applied to the first password, transmitting the first salted password to an authentication system, and gaining access to the website when the first password, the first browser identifier, and the user device identifier of the first salted password matches a stored password, a stored first browser identifier, and a stored user device identifier beyond a predetermined threshold.

Alternatively, the system may include one or more processors and a memory in communication with the one or more processors and storing instructions that when executed by the one or more processors, are configured to cause the system to perform steps of a method. The method may include receiving, from a first user device associated with a user, a first salted password associated with a website. The first salted password includes a first password, a first user device identifier, and a first browser identifier. The method may also include extracting the first password, the first user device identifier, and the first browser identifier from the first salted password; storing the first password, the first user device identifier, and the first browser identifier. The method may also include receiving, from a second user device associated with a user, a request to access the website including a second salted password. The second salted password includes a second password, a second user device identifier, and a second browser identifier. The method may also include extracting the second password, the second user device identifier, and the second browser identifier from the second salted password, retrieving the first password, the first user device identifier, and the first browser identifier, and determining whether the second password, the second user device identifier, and the second browser identifier respectively match the first password, the first user device identifier, and the first browser identifier beyond a predetermined threshold. When the second password, the second user device identifier, and the second browser identifier respectively match the first password, the first user device identifier, and the first browser identifier beyond the predetermined threshold, the method may include granting the request to access the website for the first user device. When the second password, the first user device identifier, or the first browser identifier do not respectively match the first password beyond the predetermined threshold, the first user device identifier, or the first browser identifier, the method may include performing one or more actions (e.g., denying access and/or uninstalling a browser on the first user device).

Further features of the disclosed systems, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
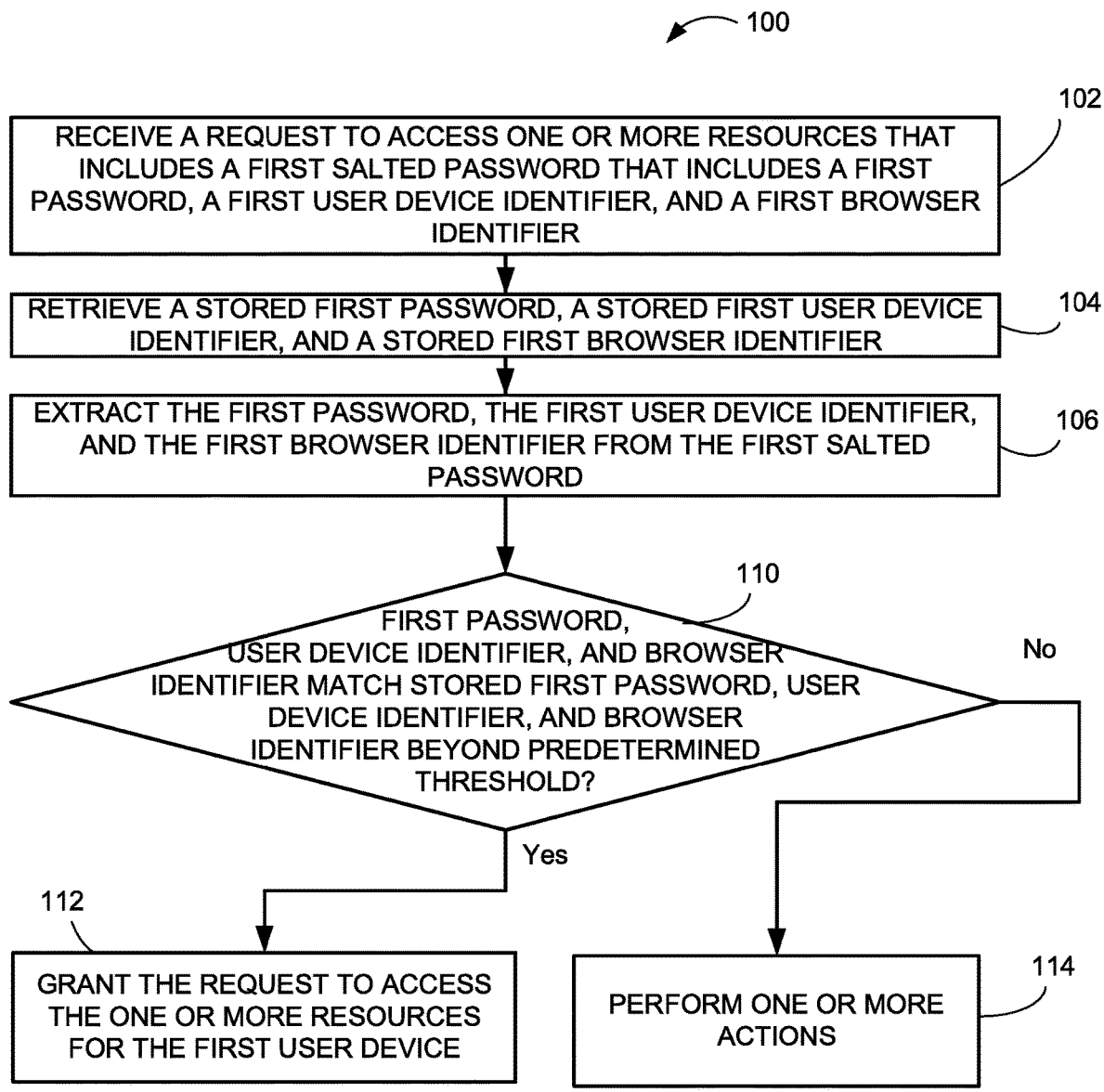
FIG. 1 is a flowchart of an exemplary method for granting access to one or more resources and/or performing one or more actions depending on whether a password, a user device identifier, and a browser identifier extracted from a received salted password match a stored password, user device identifier, and browser identifier.

FIG. 1 shows a flowchart of a method 100 for granting or denying access to one or more resources or performing one or more actions. Method 100 may be performed by an access system (e.g., an authentication system 420 and/or some or all of the devices and systems within a system 500 described in more detail with respect to FIGS. 4 and 5 below).

In block 102, an access system may receive, from a first browser (e.g., Google Chrome) of a first user device (e.g., a laptop computer) associated with a user, a request to access one or more resources. The request may include a first salted password, which may include a first password, a first user device identifier, and a first browser identifier and the one or more resources may be associated with an organization and its access system. In some embodiments, the access system may generate and transmit the first password to the user via the first user device.

The first browser may include a browser plug-in associated with the organization and its access system. As discussed more below, the browser plug-in running on the first user device may retrieve a device identifier such a media access control (MAC) address, serial number, or other number assigned to a particular device and a browser identifier such as a user agent for a particular browser. When the browser plug-in detects a website associated with accessing one or more resources from the organization and detects the user entering a password, the browser plug-generates a salt comprising the device identifier and the browser identifier, applies that salt to the password, and transmits the salted password to the access system. In some embodiments, the browser plug-in salts the password by appending the device identifier and the browser identifier at the end of the user-inputted password. In other embodiments, the browser plug-in salts the password by encrypting the user-inputted password, the device identifier, and the browser identifier with a key known to the access system.

In block 104, the access system may retrieve a stored first password, a stored first user device identifier, and a stored first browser identifier. In an embodiment, an organization may own the first user device and have issued it to the first user. Prior to issuing the first user device to the first user, the organization may store the device identifier (e.g., MAC address) associated with the first user device and store one or more browser identifier installed on the first user device. In other embodiments, the user may register the first user device and a first browser with the access system by providing a first user device identifier and a first browser identifier along with a password for registration. In an embodiment, the access system receives the first stored password from the first user device during a device registration process and subsequently stores it in a database associated with the access system.

In block 106, the access system may extract the first password, the first user device identifier, and the first browser identifier from the first salted password.

In other embodiments, the first user device identifier and the first browser identifier are appended to the first password in the first salted password. Thus, the access system analyzes the salted password and categorizes characters of the salted password as corresponding to the first password, the first user device identifier, or the first browser identifier. For example, the access system may determine that the first 6-10 characters correspond to the first password, the second 15-20 characters correspond to the first user device identifier, and the last set of characters (e.g., 60-100 characters) corresponds to the first browser identifier. The access system may be able to make those determinations because it sets character limits for passwords and it controls how the browser plug-in salts passwords.

In other embodiments, the first user device identifier and the first browser identifier are prepended to the first password in the first salted password. Thus, the access system analyzes the salted password and categorizes characters of the salted password as corresponding to the first password, the first user device identifier, or the first browser identifier. For example, the access system may determine that the first 15-20 characters correspond to the first user device identifier, the second set of characters (e.g., 60-100 characters) corresponds to the first browser identifier, and the third 15-20 characters correspond to the first user device identifier. The access system may be able to make those determinations because it sets character limits for passwords and it controls how the browser plug-in salts passwords.

In other embodiments, the first user device identifier and the first browser identifier are shuffled with the first password in the first salted password. For example, a first character of the first salted password is followed by a first character of the first user device identifier, which is followed by a first character of the first browser identifier, which is followed by a second character of the first password, which is followed by a second character of the first user device identifier, which is a second character of the first browser identifier, etcetera.

In further embodiments, the first password, the first user device identifier, and the first browser identifier are encrypted together in the first salted password using a cryptosystem (e.g., a public-key cryptosystem such as a Rivest-Shamir-Adleman (RSA) cryptosystem). Upon receipt, the access system would decrypt the first salted password before extracting the first password, the first user device identifier, and the first browser identifier from the encrypted first salted password. In some embodiments, the access system may only extract the first password from the decrypted first salted password leaving the first device identifier and the first browser identifier unknown to the access system. The access system may optionally encrypt and/or hash the stored first password. Similarly, the access system may optionally encrypt and/or hash the first password after its initial decryption. Thus, in some embodiments, the access system may compare the encrypted and/or hashed versions of the first password with the encrypted and/or hashed stored first password as discussed below in block 110.

In block 110, the access system may determine whether the first password, the first user device identifier, and the first browser identifier respectively match the stored first password, the stored first user device identifier, and the stored first browser identifier beyond a predetermined threshold. In some embodiments, the access system may encrypt and/or hash the stored first password, the stored first user device identifier, and the stored first browser identifier prior to storing them together or separately. Similarly, the access system may encrypt and/or hash the first password, the first user device identifier, and the first browser identifier (separately) after its initial (optional) decryption. Thus, in some embodiments, the access system may compare the encrypted and/or hashed versions of the first password, the first user device identifier, and the first browser identifier with the stored first password, the stored first user device identifier with the encrypted and/or hashed versions of the stored first browser identifier with the first password, the first user device identifier, and the first browser identifier.

In block 112, the access system may grant the request to access the one or more resources for the first user device when the first password, the first user device identifier, and the first browser identifier respectively match the stored first password, the stored first user device identifier, and the stored first browser identifier beyond the predetermined threshold. The one or more resources may include a website, a database, a software application, or a combination thereof. In some embodiments, the access system may grant full access to the one or more resources for the first user device when the first password, the first user device identifier, and the first browser identifier respectively match the stored first password, the stored first user device identifier, and the stored first browser identifier beyond the predetermined threshold. In an embodiment, an authorization system (separate or part of the access system) would determine what rights a user has once access is granted. The access rights may be finely controlled with various access tokens and credentials that are assigned to the varying levels (e.g., user, senior user, administrator) of permissible access. The authorization and/or access system may provide details to the user explaining his or her access rights. Also, authorization and/or access system may log and track the authorizations for audit purposes.

In block 114, the access system may perform one or more actions when the first password, the first user device identifier, or the first browser identifier respectively does not match the stored first password, the stored first user device identifier, or the stored first browser identifier beyond the predetermined threshold. In some embodiments, the access system may grant partial or limited access to the one or more resources for the first user device when two of the first password, the first user device identifier, and the first browser identifier respectively match two of the stored first password, the stored first user device identifier, and the stored first browser identifier beyond the predetermined threshold. The amount of access granted would be customizable depending on the data involved and the resource involved.

In some embodiments, when the first password does not match the stored first password beyond the predetermined threshold, but the first user device identifier and the first browser identifier respectively match the stored first user device identifier and the stored first browser identifier beyond the predetermined threshold, the one or more actions performed by the access system may include denying the request to access the one or more resources for the first user device, transmitting a password mismatch error to the first user device, or transmitting a notification via text or email to the user reporting a password mismatch, or a combination thereof.

In other embodiments, when the first password does not match the stored first password beyond the predetermined threshold, the first browser identifier does not match the stored first browser identifier beyond the predetermined threshold, but the first user device identifier matches the stored first user device identifier beyond the predetermined threshold, the one or more actions performed by the access system may include denying the request to access the one or more resources for the first user device, blocking a future access associated with the stored first password and the stored first user device identifier, remotely uninstalling a first browser associated with the first browser identifier, recording future keystrokes of the first user device, transmitting the password mismatch error to the first user device, transmitting a first browser identifier mismatch error to the first user device, or transmitting the notification via text or email to the user reporting the password mismatch and a browser mismatch, or a combination thereof.

In further embodiments, when the first password does not match the stored first password beyond the predetermined threshold, the first user device identifier does not match the stored first user device identifier beyond the predetermined threshold, but the first browser identifier matches the stored first browser identifier beyond the predetermined threshold, the one or more actions performed by the access system may include denying the request to access the one or more resources for the first user device, blocking the future access associated with the stored first password and the stored first user device identifier, transmitting a password mismatch error to the first user device, transmitting a first user device identifier mismatch error to the first user device, or transmitting the notification via text or email to the user reporting the password mismatch and a first user device identifier mismatch, or a combination thereof.

In yet another embodiment, when the first password, the first user device identifier, and the first browser identifier do not respectively match the stored first password, the stored first user device identifier, and the stored first browser identifier beyond the predetermined threshold, performing the one or more actions may include denying the request to access the one or more resources for the first user device, blocking the future access associated with the stored first password and the stored first user device identifier, transmitting the password mismatch error to the first user device, transmitting the first user device identifier mismatch error to the first user device, transmitting the first browser identifier mismatch error to the first user device, transmitting the notification via text or email to the user reporting the password mismatch, the browser mismatch, and a first user device identifier mismatch, or transmitting a message to law enforcement, or a combination thereof.

In further embodiments, when the first password matches the stored first password beyond the predetermined threshold, the first user device identifier matches the stored first user device identifier beyond the predetermined threshold, but the first browser identifier does not match the stored first browser identifier beyond the predetermined threshold, the access system may grant the request to access the one or more resources for the first user device and perform the one or more actions including transmitting the first browser identifier mismatch error to the first user device, remotely uninstalling the first browser associated with the first browser identifier after the user closes the first browser, or transmitting the notification via text or email to the user reporting the browser mismatch, or a combination thereof.

In other embodiments, when the first password matches the stored first password beyond the predetermined threshold, the first user device identifier matches the stored first user device identifier beyond the predetermined threshold, but the first browser identifier does not match the stored first browser identifier beyond the predetermined threshold, performing the one or more actions may include denying the request to access the one or more resources for the first user device, transmitting the first browser identifier mismatch error to the first user device, and remotely uninstalling the first browser associated with the first browser identifier.

In further embodiments, when the first password matches the stored first password beyond the predetermined threshold, the first browser identifier matches the stored first browser identifier beyond the predetermined threshold, but the first user device identifier does not match the stored first user device identifier beyond the predetermined threshold, the access system may grant the request to access the one or more resources for the first user device and perform the one or more actions including transmitting a user device mismatch error to the first user device or transmitting the notification via text or email to the user reporting a user device mismatch, or both.

In yet another embodiment, when the first password matches the stored first password beyond the predetermined threshold, the first browser identifier matches the stored first browser identifier beyond the predetermined threshold, but the first user device identifier does not match the stored first user device identifier beyond the predetermined threshold, performing the one or more actions may include denying the request to access the one or more resources for the first user device, blocking the future access associated with the stored first password, transmitting a user device mismatch error to the first user device, transmitting the notification via text or emailing to the user reporting a user device mismatch, or a combination thereof.

Figure 2:
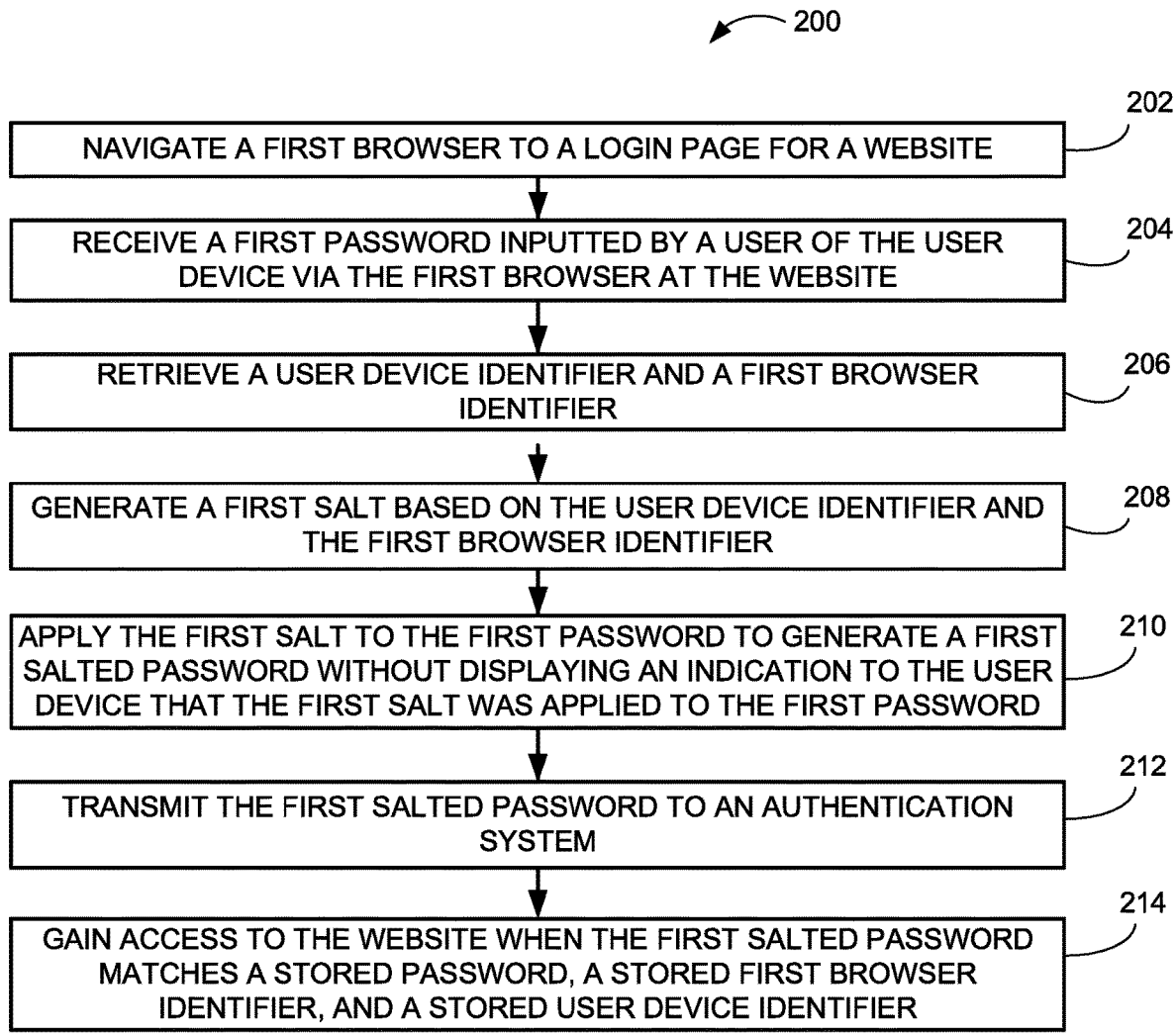
FIG. 2 is a flowchart of another exemplary method for generating and applying a salt to a password inputted from a user.

FIG. 2 shows a flowchart of a method 200 of applying a salt to a password unbeknownst to the user and transmitting a salted password to an access system in order to gain access to a website. Method 200 may be performed by a user device (e.g., user device 502 described with respect to FIGS. 4 and 5 below).

In block 202, the user device may navigate a first browser to a login page for a website. For example, a user may click a link or may enter a web address or both to navigate the user device to the login page.

In block 204, the user device may receive a first password inputted by a user of the user device via the first browser at the website. For example, the user may input the first password on a touch screen or via another input device such as a keyboard.

In block 206, the user device may retrieve a user device identifier and a first browser identifier. For example, a browser plug-in preinstalled on the user device may search and/or retrieve the user device identifier (e.g., MAC address, model number, serial number, International Mobile Equipment Identity (IMEI) number) and the first browser identifier (e.g., user agent associated with the active browser).

In block 208, the user device may generate a first salt based on the user device identifier and/or the first browser identifier by using an algorithm. In an embodiment, the browser plug-in may append the first browser identifier to the user device identifier to combine the two identifiers to one text string (e.g., "01-23-45-67-89-ABMozilla/5.0 (Windows NT 6.1; Win64; x64; rv:47.0) Gecko/20100101 Firefox/47.0"). In another embodiment, the browser plug-in may combine the first browser identifier with the user device identifier separating the two identifier by a delimiter character (e.g., a hyphen). For example, the first salt could be "01-23-45-67-89-AB-Mozilla/5.0 (Windows NT 6.1; Win64; x64; rv:47.0) Gecko/20100101 Firefox/47.0." In an embodiment, the first browser identifier and/or the user device identifier are predetermined. For example, the Chrome browser may be the following identifier "$HDF$ (S."

In block 210, the user device may apply the first salt to the first password to generate a first salted password without displaying an indication to the user device that the first salt was applied to the first password. In an embodiment, the browser plug-in may append both the combined first browser identifier to the first password to create a single text sting including the first password, the first browser identifier, and the user device identifier. In the single text string, the first password, the first browser identifier, and the user device identifier may be separated by a delimiter character (e.g., a hyphen) that would not otherwise appear in the string. Alternatively, the first salted password could be structured with named fields.

In block 212, the user device may transmit the first salted password to an authentication system. This transmission may be via a wired or wireless network (e.g., a cellular network or short-range wireless communication such as WiFi™).

In block 214, the user device may gain access to the website when the first password, the first browser identifier, and the user device identifier of the first salted password match a stored password, a stored first browser identifier, and a stored user device identifier beyond a predetermined threshold.

In some embodiments, the user device may be denied access to the website when the first salted password (i.e., the first password, the first browser identifier, and the stored user device identifier) does not match a stored password, a stored first browser identifier, and a stored user device identifier beyond the predetermined threshold. In some embodiments, the user device may receive a first prompt to enter a first code, via the first browser, that is randomly generated when the first password, the first browser identifier, and the user device identifier of the first salted password do not match the stored password, the stored first browser identifier, and the stored user device identifier beyond the predetermined threshold.

In some embodiments, the user device may receive a second code inputted by the user. For example, a user may receive the second code via email or a text message and subsequently enters the second code into a text box on the first browser. The user device may generate a second salt based on the user device identifier and the first browser identifier, apply the second salt to the second code to generate a salted code without displaying an indication to the user device that the second salt was applied to the second code, and transmit the salted code to the authentication system. The user device may receive a second prompt to enter a second password when the second code, the user device identifier, and the first browser identifier of the salted code match the first code, the stored first browser identifier, and the stored user device identifier beyond the predetermined threshold. The user device may receive the second password inputted by the user of the user device via the first browser at the website, generate a third salt based on the user device identifier and the first browser identifier, apply the third salt to the second password to generate a second salted password without displaying an indication to the user device that the first salt was applied to the second password, and transmit the second salted password to the authentication system. The user device may gain access to the website when the second password, the user device identifier, and the first browser identifier of the second salted password matches the stored password, the stored first browser identifier, and the stored user device identifier beyond the predetermined threshold.

Figure 3:
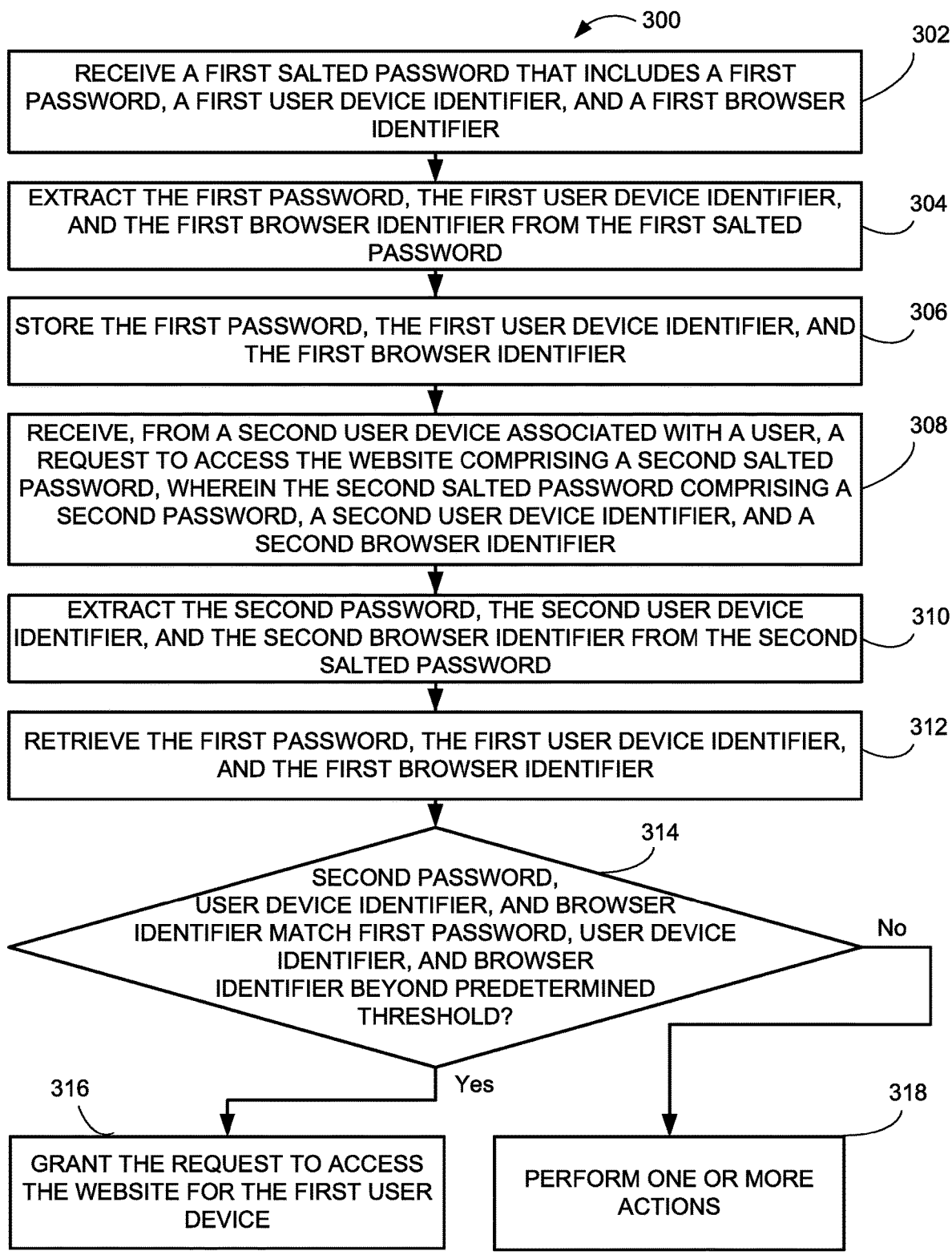
FIG. 3 is a flowchart of a further exemplary method for pre-registering a salted password for a website and granting access to the website and/or performing one or more actions depending on whether a password, a user device identifier, and a browser identifier extracted from a received salted password match a stored password, user device identifier, and browser identifier.

FIG. 3 shows a flowchart of a method 300 for granting or denying access to a website or performing one or more actions. Method 300 may be performed by an access system (e.g., an authentication system 420 and/or some or all of the devices and systems within a system 500 described in more detail with respect to FIGS. 4 and 5 below).

In block 302, the access system may receive, from a first user device associated with a user, a first salted password associated with a website. The first salted password may include a first password, a first user device identifier, and a first browser identifier.

In block 304, the access system may extract the first password, the first user device identifier, and the first browser identifier from the first salted password. In some embodiments, the first password, the first user device identifier, and the first browser identifier are appended together in the first salted password. Thus, the access system analyzes the salted password and categorizes characters of the salted password as corresponding to the first password, the first user device identifier, or the first browser identifier. For example, the access system may determine that the first 6-10 characters correspond to the first password, the second 15-20 characters correspond to the first user device identifier, and the last set of characters (e.g., 60-100 characters) corresponds to the first browser identifier. The access system may be able to make those determinations because it sets character limits for passwords and controls how the user device's browser plug-in salts passwords. In other embodiments, the first user device identifier and the first browser identifier are prepended to the first password in the first salted password. Thus, the access system analyzes the salted password and categorizes characters of the salted password as corresponding to the first password, the first user device identifier, or the first browser identifier. For example, the access system may determine that the first 15-20 characters correspond to the first user device identifier, the second set of characters (e.g., 60-100 characters) corresponds to the first browser identifier, and the third 15-20 characters correspond to the first user device identifier. The access system may be able to make those determinations because it sets character limits for passwords and it controls how the browser plug-in salts passwords.

In block 306, the access system may store the first password, the first user device identifier, and the first browser identifier in a database (e.g., database 516 discussed below).

In block 308, the access system may receive, from a second user device associated with a user, a request to access the website comprising a second salted password. The second salted password may include a second password, a second user device identifier, and a second browser identifier.

In block 310, the access system may extract the second password, the second user device identifier, and the second browser identifier from the second salted password. This may be done in a manner similar described with respect to block 304.

In block 312, the access system may retrieve the first password, the first user device identifier, and the first browser identifier. The access system may retrieve the stored password form a database (e.g., database 516).

In block 314, the access system may determine whether the second password, the second user device identifier, and the second browser identifier respectively match the first password, the first user device identifier, and the first browser identifier beyond a predetermined threshold.

In block 316, when the second password, the second user device identifier, and the second browser identifier respectively match the first password, the first user device identifier, and the first browser identifier beyond the predetermined threshold, grant the request to access the website for the first user device.

In block 318, when the second password, the first user device identifier, or the first browser identifier do not respectively match the first password beyond the predetermined threshold, the first user device identifier, or the first browser identifier, perform one or more actions.

In an embodiment, the first password and/or the second password is salted by the user device (e.g., browser plug-in) without displaying an indication to the first user device that the first salt or the second salt was applied.

In an embodiment, when the second password does not match the first password beyond the predetermined threshold, but the first user device identifier and the first browser identifier respectively match the first user device identifier and the first browser identifier beyond the predetermined threshold, the one or more actions include denying the request to access the website for the first user device, transmitting a password mismatch error to the first user device, or transmitting a notification via text or email to the user reporting a password mismatch, or a combination thereof.

In an embodiment, when the second password does not match the first password beyond the predetermined threshold, the first browser identifier does not match the first browser identifier beyond the predetermined threshold, but the first user device identifier matches the first user device identifier beyond the predetermined threshold, the one or more actions include denying the request to access the website for the first user device, blocking a future access associated with the first password and the first user device identifier, transmitting the password mismatch error to the second user device, transmitting a first browser identifier mismatch error to the second user device, or transmitting the notification via text or email to the user reporting both the password mismatch and a browser mismatch, or a combination thereof.

In an embodiment, when the second password does not match the first password beyond the predetermined threshold, the first user device identifier does not match the first user device identifier beyond the predetermined threshold, but the first browser identifier matches the first browser identifier beyond the predetermined threshold, the one or more actions include denying the request to access the website for the first user device, block the future access associated with the first password, the first user device identifier, transmitting a password mismatch error to the first user device, transmitting a first user device identifier mismatch error to the first user device, or transmitting the notification via text or email to the user reporting both the password mismatch and a first user device identifier mismatch, or a combination thereof.

In an embodiment, when the second password, the first user device identifier, and the first browser identifier do not respectively match the first password, the first user device identifier, and the first browser identifier beyond the predetermined threshold, the one or more actions include denying the request to access the website for the first user device, blocking the future access associated with the first password and the first user device identifier, transmitting the password mismatch error to the second user device, transmitting the first user device identifier mismatch error to the second user device, transmitting the first browser identifier mismatch error to the second user device, transmitting the notification via text or email to the user reporting the password mismatch, the browser mismatch, and a first user device identifier mismatch, or transmitting a message to law enforcement, or a combination thereof. The message to law enforcement may be a text message, email, or other automated message that is sent to a law enforcement server requesting response from the law enforcement. The message to law enforcement may include at least the device and browser identifiers.

In an embodiment, when the second password matches the first password and the second user device identifier matches the first user device identifier beyond the predetermined threshold, but the second browser identifier does not match the first browser identifier beyond the predetermined threshold, grant the request to access the website for the first user device and perform the one or more actions including transmitting the first browser identifier mismatch error to the second user device, or transmitting the notification via text or email to the user reporting the browser mismatch, or a combination thereof.

In an embodiment, when the second password matches the first password and the second browser identifier matches the first browser identifier beyond the predetermined threshold, but the second user device identifier does not match the first user device identifier beyond the predetermined threshold, the access system may grant the request to access the website for the second user device and perform the one or more actions including transmitting a user device mismatch error to the second user device, or transmitting the notification via text or email to the user reporting a user device mismatch, or a combination thereof.

Figure 4:
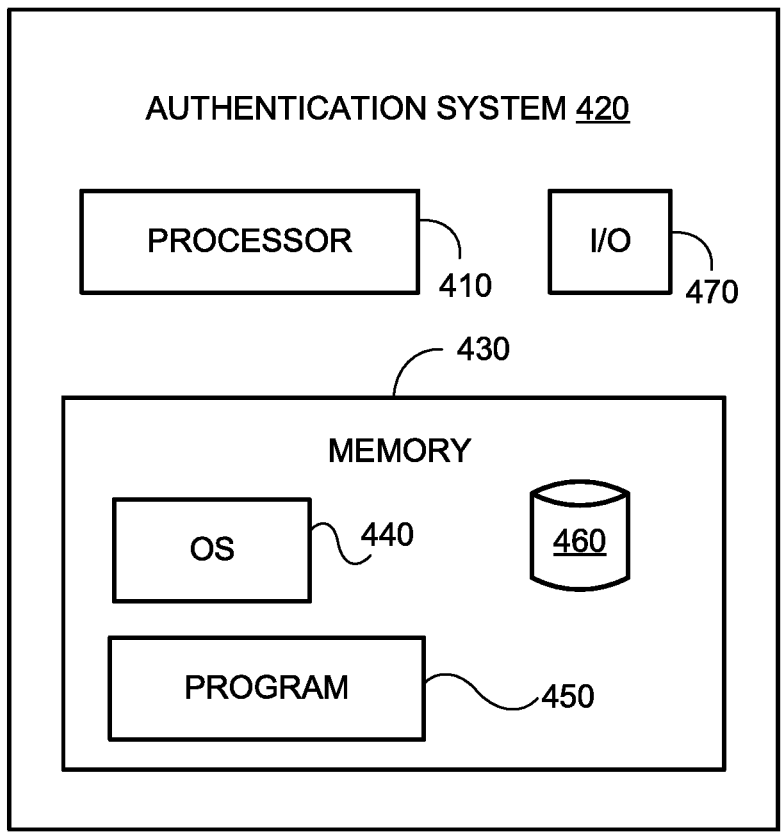
FIG. 4 is a component diagram of an example authentication system.

FIG. 4 is a component diagram of an example of the authentication system 420 that may be used to generate a merchant trust score and generate and send a payment recommendation (e.g., a temporary credit card number) to a user device for use.

As shown, authentication system 420 may include a processor 410, an input/output ("I/O") device 470, a memory 430 containing an operating system ("OS") 440 and a program 450. For example, authentication system 420 may be a single device or server or may be configured as a distributed computer system including multiple servers, devices, or computers that interoperate to perform one or more of the processes and functionalities associated with the disclosed embodiments. In some embodiments, authentication system 420 may further include a peripheral interface, a transceiver, a mobile network interface in communication with the processor 410, a bus configured to facilitate communication between the various components of authentication system 420, and a power source configured to power one or more components of authentication system 420.

A peripheral interface (not shown) may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver (not shown) may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface (not shown) may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to components requiring power.

Processor 410 may include one or more of a microprocessor, microcontroller, digital signal processor, co-processor or the like or combinations thereof capable of executing stored instructions and operating upon stored data. Memory 430 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 430.

Processor 410 may be one or more known processing devices, such as a microprocessor from the Pentium™ family manufactured by Intel™ or the Turion™ family manufactured by AMD™. Processor 410 may constitute a single core or multiple core processor that executes parallel processes simultaneously. For example, processor 410 may be a single core processor that is configured with virtual processing technologies. In certain embodiments, processor 410 may use logical processors to simultaneously execute and control multiple processes. Processor 410 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Authentication system 420 may include one or more storage devices configured to store information used by processor 410 (or other components) to perform certain functions related to the disclosed embodiments. In some embodiments, authentication system 420 may include memory 430 that includes instructions to enable processor 410 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, authentication system 420 may include memory 430 that includes instructions that, when executed by processor 410, perform one or more processes consistent with the functionalities disclosed herein. Methods, systems, and articles of manufacture consistent with disclosed embodiments are not limited to separate programs or computers configured to perform dedicated tasks. For example, authentication system 420 may include memory 430 that may include one or more programs 450 to perform one or more functions of the disclosed embodiments. Moreover, processor 410 may execute one or more programs 450 located remotely from access system 508 (see FIG. 5). For example, access system 508 may access one or more remote programs 450, that, when executed, perform functions related to disclosed embodiments. In some embodiments, authentication system 420 may include a metadata and password risk scoring program 450 that is a rules-based program for assigning or generating a metadata risk score that may represent how closely metadata (e.g., user device location information, MAC ID of the user device, and an attempted login time) associated with an attempted login corresponds to metadata associated with previous attempted logins and assigning or generating a password risk score that may represent how closely an attempted password corresponds to previous attempted passwords and a correct password.

Memory 430 may include one or more memory devices that store data and instructions used to perform one or more features of the disclosed embodiments. Memory 430 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 430 may include software components that, when executed by processor 410, perform one or more processes consistent with the disclosed embodiments. In some embodiments, memory 430 may include a database 460 for storing related data to enable authentication system 420 to perform one or more of the processes and functionalities associated with the disclosed embodiments.

Authentication system 420 may also be communicatively connected to one or more memory devices (e.g., databases) locally or through a network. The remote memory devices may be configured to store information and may be accessed and/or managed by authentication system 420. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Authentication system 420 may also include one or more I/O devices 470 that may comprise one or more interfaces for receiving signals or input from devices and providing signals or output to one or more devices that allow data to be received and/or transmitted by authentication system 420. For example, authentication system 420 may include interface components, which may provide interfaces to one or more input devices, such as one or more keyboards, mouse devices, touch screens, track pads, trackballs, scroll wheels, digital cameras, microphones, sensors, and the like, that enable authentication system 420 to receive data from one or more users.

In exemplary embodiments of the disclosed technology, authentication system 420 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

Figure 5:
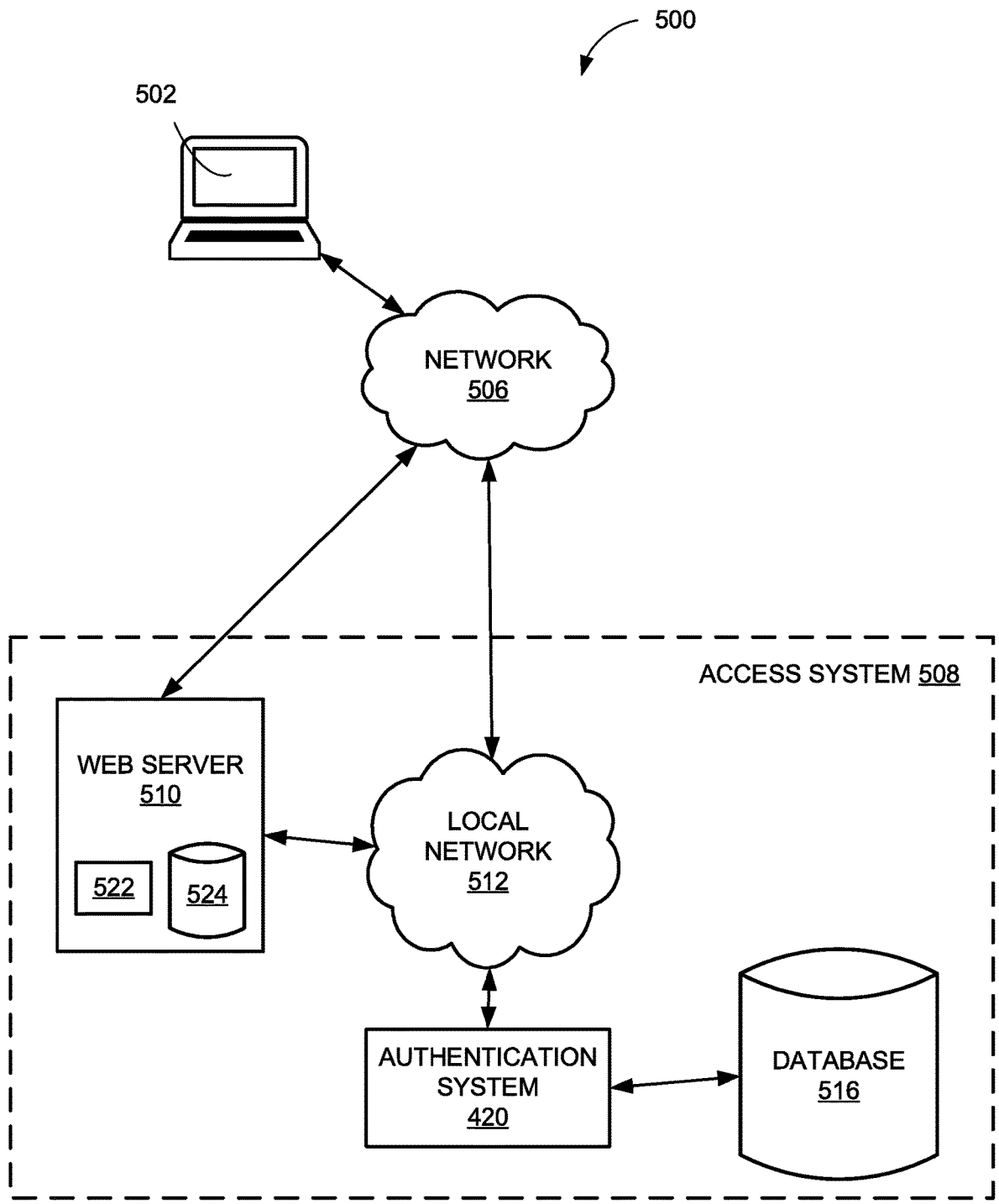
FIG. 5 is a diagram of an exemplary system for extracting components of a salted password and determining whether to grant access or perform other actions based on comparing those extracted components to stored components.

FIG. 5 is a diagram of an exemplary system for extracting components of a salted password and determining whether to grant access or perform other actions based on comparing those extracted components to stored components. The components and arrangements shown in FIG. 5 are not intended to limit the disclosed embodiments as the components used to implement the disclosed processes and features may vary. As system 500 may include a user device 502 and an access system 508 configured to communicate over a network 506. The access system 508, or one or more components therein, may be configured to interact with the user device 502 (e.g., send an age of a merchant). As shown, the access system 508 may include, for example, a web server 510, a local network 512, an authentication system 420, and a database 516. Web server 510 and/or user device 502 may have a similar structure as shown and described with respect to FIG. 4 and may include many components that are similar to or even have the same capabilities as those described with respect to authentication system 420.

In some embodiments, a customer may operate a user device 502. Although user device 502 is shown to be a smart phone, user device 502 can each include one or more of a mobile device, smart phone, general purpose computer, tablet computer, laptop computer, telephone, PSTN landline, smart wearable device, other mobile computing device, or any other device capable of communicating with other devices (e.g., including those of access system 508) via the local network 512, network 506, or both. In some embodiments, user device 102 may include or incorporate electronic communication devices for hearing or vision impaired users. User device 102 may belong to or be provided by a user, or may be borrowed, rented, or shared. According to some embodiments, user devices 502 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Local network 512 may comprise any type of computer networking arrangement used to exchange data in a localized area, such as WiFi, Bluetooth™, Ethernet, and other suitable network connections that enable user device 102 to interact with one another and to connect to network 506 for interacting with components in system environment 500. In some embodiments, local network 512 may comprise an interface for communicating with or linking to network 506. In some embodiments, local network 512 may include a home network, such as a LAN or WLAN set up in a user's house. In some embodiments, local network 512 may be commonly used network of a local business, such as, for example, a Wi-Fi network at a particular coffee shop.

Network 506 may be of any suitable type, including individual connections via the internet such as cellular or WiFi networks. In some embodiments, network 506 may connect terminals, services, and mobile devices including by using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 506 may comprise any type of computer networking arrangement used to exchange data. For example, network 506 may be the Internet, a private data network, virtual private network using a public network, and/or other suitable connection(s) that enables components in system environment 500 to send and receive information between the components of system 500. Network 506 may also include a public switched telephone network ("PSTN") and/or a wireless network.

Access system 508 may be associated with an entity such as a business, corporation, individual, partnership, or any other group that provides one or more of goods, services, and consultations to individuals who are or potentially are consumers of those goods, services, and consultations.

Access system 508 may include one or more servers, devices, and computer systems for performing one or more functions associated with products and/or services that the entity associated with the access system 508 provides. Such servers, devices, and computer systems may include, for example, web server 510 and authentication system 420, as well as any other computer systems necessary to accomplish tasks associated with access system 508.

Web server 510 may include a computer system configured to generate and provide one or more websites accessible to customers, as well as any other individuals involved in access system 508's normal operations. Web server 510 may include a computer system configured to receive communications from user device 502 via for example, a mobile application, a chat program, an instant messaging program, a voice-to-text program, an SMS message, email, or any other type or format of written or electronic communication. Web server 510 may have one or more processors 522 and one or more web server databases 524, which may be any suitable repository of website data. Information stored in web server 510 may be accessed (e.g., retrieved, updated, and added to) via local network 512 and/or network 506 by one or more devices or systems (e.g., authentication system 510) of system 500. In some embodiments, web server 510 may host websites or applications that may be accessed by the user device 102. For example, web server 510 may host a financial service provider website that a user device may access by providing an attempted login that are authenticated by the authentication system 420. According to some embodiments, web server 510 may include software tools, similar to those described with respect to user device 502 above, that may allow web server 510 to obtain network identification data from user device 502.

Local networks 512 may comprise any type of computer networking arrangement used to exchange data in a localized area, such as WiFi, Bluetooth™, Ethernet, and other suitable network connections that enable components of access system 508 to interact with one another and to connect to network 506 for interacting with components in system environment 500. In some embodiments, local network 512 may comprise an interface for communicating with or linking to network 506. In other embodiments, components of access system 508 may communicate via network 506, without a separate local network 512.

Database 516 may be a database associated with access system 508 and may store a variety of information relating to users, transactions, user credentials (e.g., usernames and passwords), customer networks and devices, and business operations. Database 516 may also serve as a back-up storage device and may contain data and information that is also stored on, for example, local databases associated with web server 510, authentication system 420. Database 516 may be accessed by other devices or systems (e.g., authentication system 420) and may be used to store records of every interaction, communication, and/or transaction a particular user has had with access system 508.

While web server 510 and authentication system 420 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the web server 510 and authentication system 420 may include a greater or lesser number of components than those illustrated.

Although the preceding description describes various functions of user device 102, web server 510, database 516, and authentication system 420, in some embodiments, some or all of these functions may be carried out by a single computing device.

Figure 6:
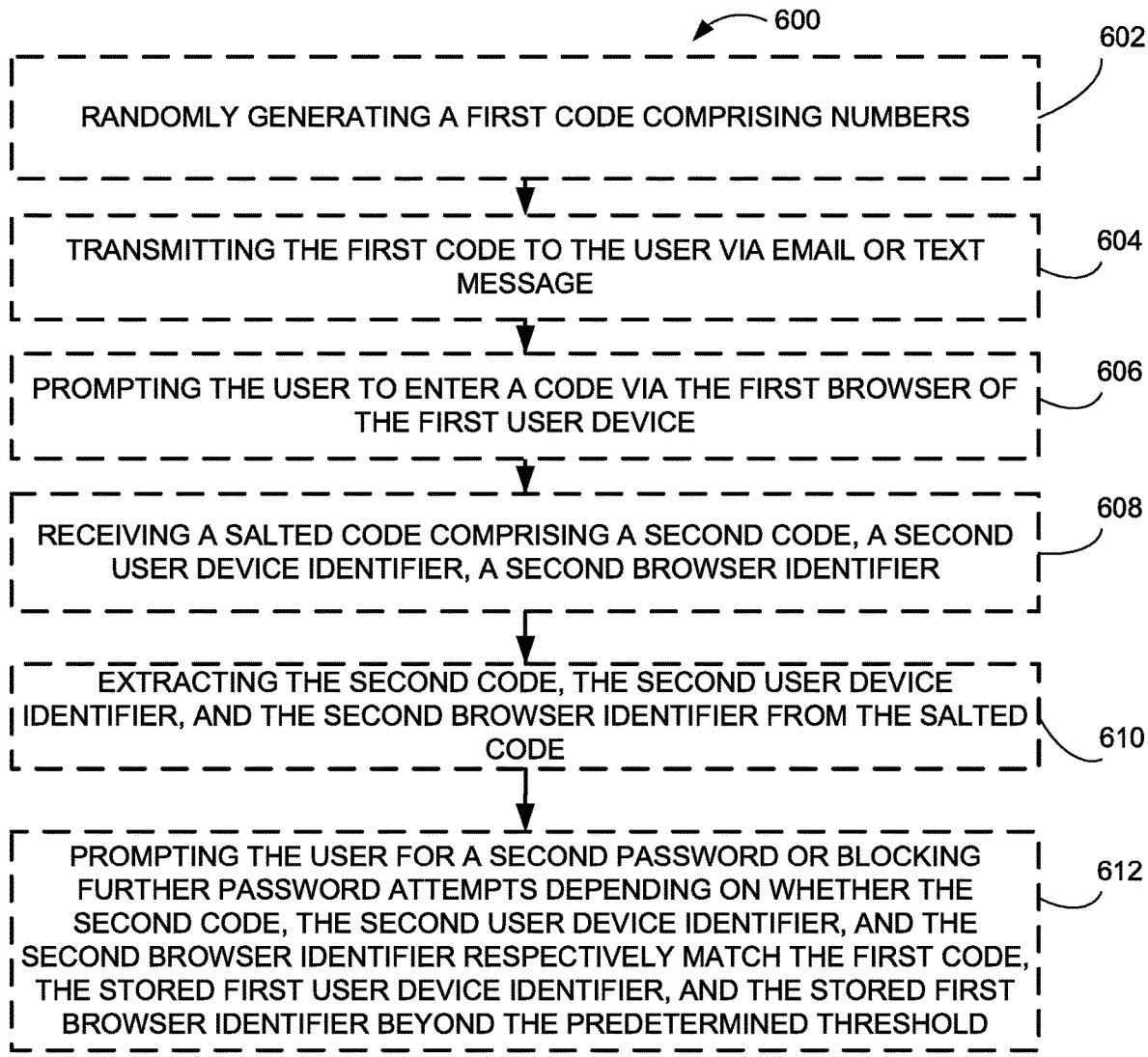
FIG. 6 a flowchart of a further exemplary method of applying a salt to a two-factor authentication method.

FIG. 6 shows a flowchart of a method 600 which modifies method 100. In an embodiment shown with respect to FIG. 6, the one or more actions selectively performed by the access system may include a modified two-factor authentication process. Specifically, the access system may randomly generate a first code including numbers (block 602) and transmit the first code to the user via email or text message (block 604). The access system may also prompt the user to enter a code via the first browser of the first user device (block 606). For example, the access system may direct the first browser of the first user device to system to a webpage that includes a code input box for facilitating an input of a code by the first user. The access system may receive a salted code (e.g., via the code input box) that includes a second code, a second user device identifier, and a second browser identifier (block 608). The access system may extract the second code, the second user device identifier, and the second browser identifier from the salted code in a similar manner in which the access system extracts the first password, the first user device identifier, and the first browser identifier from the first salted password (block 610). The access system may determine whether the second code, the second user device identifier, and the second browser identifier respectively match the first code, the stored first user device identifier, and the stored first browser identifier beyond the predetermined threshold in a similar manner in which the access system determine whether the first password, the first user device identifier, and the first browser identifier respectively match the stored first password, the stored first user device identifier, and the stored first browser identifier beyond the predetermined threshold. Depending on whether the second code, the second user device identifier, and the second browser identifier respectively match the first code, the stored first user device identifier, and the stored first browser identifier beyond the predetermined threshold, the access system may prompt the user for a second password or block further password attempts (block 612).

Exemplary Use Cases

The following exemplary use cases describe examples of a typical user flow pattern. They are intended solely for explanatory purposes and not in limitation.

In one exemplary use case from the perspective of the access system 508, the access system 508 for an organization (e.g., a business) or a third party access system working on behalf of the organization may receive, from a first browser (e.g., Mozilla FireFox) of a first user device 502 associated with a user, a request to access one or more resources. The request may include a first salted password (e.g., mydog123!01-23-45-67-89-ABMozilla/5.0 (Windows NT 6.1; Win64; x64; rv:47.0) Gecko/20100101 Firefox/47.0), with the first salted password including a first password (e.g., mydog123!), a first user device identifier (e.g., a MAC address such as "01-23-45-67-89-AB"), and a first browser identifier (e.g., a user agent string such as "Mozilla/5.0 (Windows NT 6.1; Win64; x64; rv:47.0) Gecko/20100101 Firefox/47.0"). The access system 508 may retrieve a stored first password (e.g., mydog123!), a stored first user device identifier (e.g., 01-23-45-67-89-AB), and a stored first browser identifier (e.g., Mozilla/5.0 (Windows NT 6.1; Win64; x64; rv:47.0) Gecko/20100101 Firefox/47.0). The access system 508 may extract the first password (e.g., mydog123!), the first user device identifier (e.g., 01-23-45-67-89-AB), and the first browser identifier (e.g., Mozilla/5.0 (Windows NT 6.1; Win64; x64; rv:47.0) Gecko/20100101 Firefox/47.0) from the first salted password (e.g., mydog123!01-23-45-67-89-ABMozilla/5.0 (Windows NT 6.1; Win64; x64; rv:47.0) Gecko/20100101 Firefox/47.0). The access system 508 may respectively compare the first password (e.g., mydog123!), the first user device identifier (e.g., 01-23-45-67-89-AB), and the first browser identifier to the stored first password (e.g., mydog123!), the stored first user device identifier (e.g., 01-23-45-67-89-AB), and the stored first browser identifier (e.g., mydog123!01-23-45-67-89-ABMozilla/5.0 (Windows NT 6.1; Win64; x64; rv:47.0) Gecko/20100101 Firefox/47.0). The access system 508 may determine whether the first password, the first user device identifier, and the first browser identifier respectively match the stored first password, the stored first user device identifier, and the stored first browser identifier beyond a predetermined threshold. When the first password, the first user device identifier, and the first browser identifier respectively match the stored first password, the stored first user device identifier, and the stored first browser identifier beyond the predetermined threshold, the access system 508 may grant the request to access the one or more resources for the first user device 502. When the first password, the first user device identifier, or the first browser identifier do not respectively match the stored first password, the stored first user device identifier, or the stored first browser identifier beyond the predetermined threshold, the access system 508 may perform one or more actions.

The one or more actions may be performed in addition to granting access to the one or more resources for the first user device 502. For example, the access system 508 may transmit the first browser identifier mismatch error (e.g., a message comprising "unauthorized browser") to the first user device 502 thereby notifying the user of the first user that he is using an unauthorized browser when the first password matches the stored first password beyond the predetermined threshold, the first user device identifier matches the stored first user device identifier beyond the predetermined threshold, but the first browser identifier does not match the stored first browser identifier beyond the predetermined threshold. When the first user device 502 is issued, owned, and/or controlled by the organization and under the same conditions, the access system 508 may also remotely uninstall or instruct another system of the organization (or a system of a third party working for the organization) to remotely uninstall the first browser associated with the first browser identifier after the user closes the first browser. Also, when the first user device 502 is internet connected, it could be set in a state that would limit user-controlled access. The access system 508 may also transmit the notification via text or email to the user reporting the browser mismatch in the same scenario.

In another example when the one or more actions may be performed in addition to granting access to the one or more resources for the first user device 502, the access system 508 may transmit a user device mismatch error (e.g., a message comprising "unauthorized device") to the first user device 502 or transmit the notification via text or email to the user reporting a user device mismatch, or both when the first password matches the stored first password beyond the predetermined threshold, the first browser identifier matches the stored first browser identifier beyond the predetermined threshold, but the first user device identifier does not match the stored first user device identifier beyond the predetermined threshold.

The one or more actions may be performed in lieu of granting access to the one or more resources for the first user device 502. For example, the access system 508 may facilitate a unique highly secure two-factor authentication process with the first user device 502 by randomly generating a first code (e.g., 123456), transmitting the first code (e.g., 123456) to the user via email or text message, prompting the user to enter a code (e.g., 123456) via the first browser of the first user device 502, receiving a salted code (e.g., 12345601-23-45-67-89-ABMozilla/5.0 (Windows NT 6.1; Win64; x64; rv:47.0) Gecko/20100101 Firefox/47.0) comprising a second code (e.g., 123456), a second user device identifier (e.g., 01-23-45-67-89-AB), and a second browser identifier (e.g., Mozilla/5.0 (Windows NT 6.1; Win64; x64; rv:47.0) Gecko/20100101 Firefox/47.0), extracting the second code, the second user device identifier, and the second browser identifier from the salted code, and prompting the user for a second password or block further password attempts depending on whether the second code, the second user device identifier, and the second browser identifier respectively match the first code, the stored first user device identifier, and the stored first browser identifier beyond the predetermined threshold.

In another example when the one or more actions may be performed in lieu of granting access to the one or more resources for the first user device 502, the access system 508 may deny the request to access the one or more resources for the first user device 502, transmit a password mismatch error to the first user device 502, or transmit a notification via text or email to the user reporting a password mismatch, or a combination thereof when the first password does not match the stored first password beyond the predetermined threshold, but the first user device identifier and the first browser identifier respectively match the stored first user device identifier and the first browser identifier beyond the predetermined threshold.

In another example when the one or more actions may be performed in lieu of granting access to the one or more resources for the first user device 502, the access system 508 may deny the request to access the one or more resources for the first user device 502, block a future access associated with the stored first password (and possibly requiring a user to reset their password), the stored first user device identifier, remotely uninstall a first browser associated with the first browser identifier, record future keystrokes of the first user device by using a key logger that would transmit back to the access system 508 for a given amount of key strokes per a give amount of time, transmit the password mismatch error to the first user device 502, transmit a first browser identifier mismatch error to the first user device, or transmit the notification via text or email to the user reporting the password mismatch and a browser mismatch, or a combination thereof when the first password does not match the stored first password beyond the predetermined threshold, the first browser identifier does not match the stored first browser identifier beyond the predetermined threshold, but the first user device identifier matches the stored first user device identifier beyond the predetermined threshold.

In another example when the one or more actions may be performed in lieu of granting access to the one or more resources for the first user device 502, the access system 508 may deny the request to access the one or more resources for the first user device 502, block the future access associated with the stored first password, the stored first user device identifier, transmit a password mismatch error to the first user device 502, transmit a first user device identifier mismatch error to the first user device, or transmit the notification via text or email to the user reporting the password mismatch and a first user device identifier mismatch, or a combination thereof when the first password does not match the stored first password beyond the predetermined threshold, the first user device identifier does not match the stored first user device identifier beyond the predetermined threshold, but the first browser identifier matches the stored first browser identifier beyond the predetermined threshold.

In another example when the one or more actions may be performed in lieu of granting access to the one or more resources for the first user device 502, the access system 508 may deny the request to access the one or more resources for the first user device 502, block the future access associated with the stored first password, the stored first user device identifier, transmit the password mismatch error to the first user device, transmit the first user device identifier mismatch error to the first user device 502, transmit the first browser identifier mismatch error to the first user device 502, transmit the notification via text or email to the user reporting the password mismatch, the browser mismatch, and a first user device identifier mismatch, or transmit a message to law enforcement, or a combination thereof when the first password, the first user device identifier, and the first browser identifier do not respectively match the stored first password, the stored first user device identifier, and the stored first browser identifier beyond the predetermined threshold.

In another example when the one or more actions may be performed in lieu of granting access to the one or more resources for the first user device 502, the access system 508 may deny the request to access the one or more resources for the first user device 502, transmit the first browser identifier mismatch error to the first user device 502, and remotely uninstall the first browser associated with the first browser identifier when the first password matches the stored first password beyond the predetermined threshold, the first user device identifier matches the stored first user device identifier beyond the predetermined threshold, but the first browser identifier does not match the stored first browser identifier beyond the predetermined threshold.

In another example when the one or more actions may be performed in lieu of granting access to the one or more resources for the first user device 502, the access system 508 may deny the request to access the one or more resources for the first user device, block the future access associated with the stored first password, transmit a user device mismatch error to the first user device, transmit the notification via text or email to the user reporting a user device mismatch when the first password matches the stored first password beyond the predetermined threshold, when the first password matches the stored first password beyond the predetermined threshold, the first browser identifier matches the stored first browser identifier beyond the predetermined threshold, but the first user device identifier does not match the stored first user device identifier beyond the predetermined threshold.

In another exemplary use case from the perspective of the user device 502, the user device 502 may navigate a first browser to a login page for a website, receive a first password (e.g., mydog123!) inputted by a user of the user device via the first browser at the website, retrieve a user device identifier (e.g., a MAC address such as "01-23-45-67-89-AB") and a first browser identifier (e.g., a user agent string such as "Mozilla/5.0 (Windows NT 6.1; Win64; x64; rv:47.0) Gecko/20100101 Firefox/47.0"), generate (e.g., via a browser plugin or other program installed on the user device) a first salt (e.g., 01-23-45-67-89-ABMozilla/5.0 (Windows NT 6.1; Win64; x64; rv:47.0) Gecko/20100101 Firefox/47.0) based on the user device identifier and the first browser identifier, apply the first salt to the first password to generate a first salted password (e.g., mydog123!01-23-45-67-89-ABMozilla/5.0 (Windows NT 6.1; Win64; x64; rv:47.0) Gecko/20100101 Firefox/47.0) without displaying an indication to the user device that the first salt was applied to the first password, transmit the first salted password to an authentication system, and gain access to the website when the first password, the first browser identifier, and the user device identifier of the first salted password matches a stored password, a stored first browser identifier, and a stored user device identifier beyond a predetermined threshold.

The user device 502 may receive an access denial message from the authentication system 420 when the first password, the first browser identifier, and the user device identifier of the first salted password do not match the stored password, the stored first browser identifier, and the stored user device identifier beyond the predetermined threshold.

The user device 502 may participate in a unique two-factor authentication process. For example, the user device 502 may receive a first prompt to enter a first code, via the first browser, that is randomly generated when the first password, the first browser identifier, and the user device identifier of the first salted password do not match the stored password, the stored first browser identifier, and the stored user device identifier beyond the predetermined threshold. The user device 502 may receive a second code inputted by the user, generate a second salt based on the user device identifier and the first browser identifier, apply the second salt to the second code to generate a salted code without displaying an indication to the user device that the second salt was applied to the second code, transmit the salted code to the authentication system, receive a second prompt to enter a second password when the salted code matches the first code, the stored first browser identifier, and the stored user device identifier beyond the predetermined threshold, and receive the second password inputted by the user of the user device via the first browser at the website, generate a third salt based on the user device identifier and the first browser identifier, apply the third salt to the second password to generate a second salted password without displaying an indication to the user device that the first salt was applied to the second password, transmit the second salted password to the authentication system, and gain access to the website when the second salted password matches the stored password, the stored first browser identifier, and the stored user device identifier beyond the predetermined threshold.

In one exemplary use case from the perspective of the access system 508, the access system 508 may receive, from a first user device 502 associated with a user, a first salted password associated with a website (e.g., a website of a financial service provider). The first salted password includes a first password, a first user device identifier, and a first browser identifier. The access system 508 may extract the first password, the first user device identifier, and the first browser identifier from the first salted password, store the first password, the first user device identifier, and the first browser identifier, receive, from a second user device 508 (the same as or different from the first user device 508) associated with a user, a request to access the website comprising a second salted password. The second salted password including a second password, a second user device identifier, and a second browser identifier. The access system 508 may extract the second password, the second user device identifier, and the second browser identifier from the second salted password, retrieve the first password, the first user device identifier, and the first browser identifier, determine whether the second password, the second user device identifier, and the second browser identifier respectively match the first password, the first user device identifier, and the first browser identifier beyond a predetermined threshold. When the second password, the second user device identifier, and the second browser identifier respectively match the first password, the first user device identifier, and the first browser identifier beyond the predetermined threshold, the access system 508 may grant the request to access the website for the first user device 502. When the second password, the first user device identifier, or the first browser identifier do not respectively match the first password beyond the predetermined threshold, the first user device identifier, or the first browser identifier, perform one or more actions. The one or more actions may be similar to those discussed with respect to the initial exemplary use case.

To perform these various exemplary use cases, in some examples, the system may include one or more processors and a memory in communication with the one or more processors and storing instructions that when executed by the one or more processors, are configured to cause the system to perform steps of a method. The method may include receiving, from a first browser of a first user device associated with a user, a request to access one or more resources, wherein the request comprises a first salted password, wherein the first salted password comprising a first password, a first user device identifier, and a first browser identifier, retrieving a stored first password, a stored first user device identifier, and a stored first browser identifier, extracting the first password, the first user device identifier, and the first browser identifier from the first salted password, respectively comparing the first password, the first user device identifier, and the first browser identifier to the stored first password, the stored first user device identifier, and the stored first browser identifier, determining whether the first password, the first user device identifier, and the first browser identifier respectively match the stored first password, the stored first user device identifier, and the stored first browser identifier beyond a predetermined threshold. The method may also include grant the request to access the one or more resources for the first user device when the first password, the first user device identifier, and the first browser identifier respectively match the stored first password, the stored first user device identifier, and the stored first browser identifier beyond the predetermined threshold. The method may also include performing one or more actions when the first password, the first user device identifier, or the first browser identifier do not respectively match the stored first password, the stored first user device identifier, or the stored first browser identifier beyond the predetermined threshold.

The method may further include generating and transmitting the first password to the user via the first user device.

In the method, the first stored password is received from the first user device during a device registration process and subsequently stored in a database associated with the system.

In the method, the one or more actions include randomly generating a first code comprising numbers, transmitting the first code to the user via email or text message, prompting the user to enter a code via the first browser of the first user device, receiving a salted code comprising a second code, a second user device identifier, and a second browser identifier, extracting the second code, the second user device identifier, and the second browser identifier from the salted code, and prompting the user for a second password or block further password attempts depending on whether the second code, the second user device identifier, and the second browser identifier respectively match the first code, the stored first user device identifier, and the stored first browser identifier beyond the predetermined threshold.

In the method, performing the one or more actions includes denying the request to access the one or more resources for the first user device, transmitting a password mismatch error to the first user device, or transmitting a notification via text or email to the user reporting a password mismatch, or a combination thereof when the first password does not match the stored first password beyond the predetermined threshold, but the first user device identifier and the first browser identifier respectively match the stored first user device identifier and the first browser identifier beyond the predetermined threshold.

In the method, performing the one or more actions includes denying the request to access the one or more resources for the first user device, blocking a future access associated with the stored first password, the stored first user device identifier, remotely uninstalling a first browser associated with the first browser identifier, recording future keystrokes of the first user device, transmit the password mismatch error to the first user device, transmitting a first browser identifier mismatch error to the first user device, or transmitting the notification via text or email to the user reporting the password mismatch and a browser mismatch, or a combination thereof when the first password does not match the stored first password beyond the predetermined threshold, the first browser identifier does not match the stored first browser identifier beyond the predetermined threshold, but the first user device identifier matches the stored first user device identifier beyond the predetermined threshold.

In the method, performing the one or more actions includes denying the request to access the one or more resources for the first user device, blocking the future access associated with the stored first password, the stored first user device identifier, transmitting a password mismatch error to the first user device, transmitting a first user device identifier mismatch error to the first user device, or transmitting the notification via text or email to the user reporting the password mismatch and a first user device identifier mismatch, or a combination thereof when the first password does not match the stored first password beyond the predetermined threshold, the first user device identifier does not match the stored first user device identifier beyond the predetermined threshold, but the first browser identifier matches the stored first browser identifier beyond the predetermined threshold.

In the method, performing the one or more actions includes denying the request to access the one or more resources for the first user device, blocking the future access associated with the stored first password, the stored first user device identifier, transmitting the password mismatch error to the first user device, transmitting the first user device identifier mismatch error to the first user device, transmitting the first browser identifier mismatch error to the first user device, transmitting the notification via text or email to the user reporting the password mismatch, the browser mismatch, and a first user device identifier mismatch, or transmitting a message to law enforcement, or a combination thereof when the first password, the first user device identifier, and the first browser identifier do not respectively match the stored first password, the stored first user device identifier, and the stored first browser identifier beyond the predetermined threshold.

In the method, performing the one or more actions includes transmitting the first browser identifier mismatch error to the first user device, remotely uninstalling the first browser associated with the first browser identifier after the user closes the first browser, or transmitting the notification via text or email to the user reporting the browser mismatch, or a combination thereof when the first password matches the stored first password beyond the predetermined threshold, the first user device identifier matches the stored first user device identifier beyond the predetermined threshold, but the first browser identifier does not match the stored first browser identifier beyond the predetermined threshold.

In the method, performing the one or more actions includes denying the request to access the one or more resources for the first user device, transmitting the first browser identifier mismatch error to the first user device, and remotely uninstalling the first browser associated with the first browser identifier when the first password matches the stored first password beyond the predetermined threshold, the first user device identifier matches the stored first user device identifier beyond the predetermined threshold, but the first browser identifier does not match the stored first browser identifier beyond the predetermined threshold.

In the method, performing the one or more actions includes transmitting a user device mismatch error to the first user device or transmitting the notification via text or email to the user reporting a user device mismatch, or both when the first password matches the stored first password beyond the predetermined threshold, the first browser identifier matches the stored first browser identifier beyond the predetermined threshold, but the first user device identifier does not match the stored first user device identifier beyond the predetermined threshold.

In the method, performing the one or more actions includes denying the request to access the one or more resources for the first user device, blocking the future access associated with the stored first password, transmitting a user device mismatch error to the first user device, transmitting the notification via text or email to the user reporting a user device mismatch when the first password matches the stored first password beyond the predetermined threshold, the first browser identifier matches the stored first browser identifier beyond the predetermined threshold, but the first user device identifier does not match the stored first user device identifier beyond the predetermined threshold.

To perform these various exemplary uses cases, in some examples, the user device may include one or more processors and a memory in communication with the one or more processors and storing instructions that when executed by the one or more processors, are configured to cause the user device to perform steps of a method. The method may include navigating a first browser to a login page for a website, receiving a first password inputted by a user of the user device via the first browser at the website, retrieving a user device identifier and a first browser identifier, generating a first salt based on the user device identifier and the first browser identifier, applying the first salt to the first password to generate a first salted password without displaying an indication to the user device that the first salt was applied to the first password, transmitting the first salted password to an authentication system, and gaining access to the website when the first password, the first browser identifier, and the user device identifier of the first salted password matches a stored password, a stored first browser identifier, and a stored user device identifier beyond a predetermined threshold.

The method for the user device may also include receiving an access denial message from the authentication system when the first password, the first browser identifier, and the user device identifier of the first salted password do not match the stored password, the stored first browser identifier, and the stored user device identifier beyond the predetermined threshold.

The method for the user device may also include receiving a first prompt to enter a first code, via the first browser, that is randomly generated when the first password, the first browser identifier, and the user device identifier of the first salted password do not match the stored password, the stored first browser identifier, and the stored user device identifier beyond the predetermined threshold.

The method for the user device may also include receiving a second code inputted by the user, generating a second salt based on the user device identifier and the first browser identifier; applying the second salt to the second code to generate a salted code without displaying an indication to the user device that the second salt was applied to the second code, transmitting the salted code to the authentication system, receiving a second prompt to enter a second password when the salted code matches the first code, the stored first browser identifier, and the stored user device identifier beyond the predetermined threshold, receiving the second password inputted by the user of the user device via the first browser at the website, generating a third salt based on the user device identifier and the first browser identifier, applying the third salt to the second password to generate a second salted password without displaying an indication to the user device that the first salt was applied to the second password, transmitting the second salted password to the authentication system, and gaining access to the website when the second salted password matches the stored password, the stored first browser identifier, and the stored user device identifier beyond the predetermined threshold.

To perform these various exemplary uses cases, in some examples, the system may include one or more processors and a memory in communication with the one or more processors and storing instructions that when executed by the one or more processors, are configured to cause the system to perform steps of a second system method. The second system method may include receiving, from a first user device associated with a user, a first salted password associated with a website, wherein the first salted password comprising a first password, a first user device identifier, and a first browser identifier, extracting the first password, the first user device identifier, and the first browser identifier from the first salted password; storing the first password, the first user device identifier, and the first browser identifier, receiving, from a second user device associated with a user, a request to access the website comprising a second salted password, wherein the second salted password comprising a second password, a second user device identifier, and a second browser identifier, extracting the second password, the second user device identifier, and the second browser identifier from the second salted password, retrieve the first password, the first user device identifier, and the first browser identifier, determining whether the second password, the second user device identifier, and the second browser identifier respectively match the first password, the first user device identifier, and the first browser identifier beyond a predetermined threshold. When the second password, the second user device identifier, and the second browser identifier respectively match the first password, the first user device identifier, and the first browser identifier beyond the predetermined threshold, granting the request to access the website for the first user device. When the second password, the first user device identifier, or the first browser identifier do not respectively match the first password beyond the predetermined threshold, the first user device identifier, or the first browser identifier, performing one or more actions.

In the second system method, performing the one or actions may include denying the request to access the website for the first user device, transmitting a password mismatch error to the first user device, or transmitting a notification via text or email to the user reporting a password mismatch, or a combination thereof when the second password does not match the first password beyond the predetermined threshold, but the first user device identifier and the first browser identifier respectively match the first user device identifier and the first browser identifier beyond the predetermined threshold. In the second system method, performing the one or actions may include denying the request to access the website for the first user device, blocking a future access associated with the first password and the first user device identifier, transmitting the password mismatch error to the second user device, transmitting a first browser identifier mismatch error to the second user device, or transmitting the notification via text or email to the user reporting both the password mismatch and a browser mismatch, or a combination thereof when the second password does not match the first password beyond the predetermined threshold, the first browser identifier does not match the first browser identifier beyond the predetermined threshold, but the first user device identifier matches the first user device identifier beyond the predetermined threshold. In the second system method, performing the one or actions may include denying the request to access the website for the first user device, blocking the future access associated with the first password, the first user device identifier, transmit a password mismatch error to the first user device, transmit a first user device identifier mismatch error to the first user device, or transmit the notification via text or email to the user reporting both the password mismatch and a first user device identifier mismatch, or a combination thereof when the second password does not match the first password beyond the predetermined threshold, the first user device identifier does not match the first user device identifier beyond the predetermined threshold, but the first browser identifier matches the first browser identifier beyond the predetermined threshold. In the second system method, performing the one or actions may include denying the request to access the website for the first user device, blocking the future access associated with the first password and the first user device identifier, transmitting the password mismatch error to the second user device, transmitting the first user device identifier mismatch error to the second user device, transmitting the first browser identifier mismatch error to the second user device, transmitting the notification via text or email to the user reporting the password mismatch, the browser mismatch, and a first user device identifier mismatch, or transmit a message to law enforcement, or a combination thereof when the second password, the first user device identifier, and the first browser identifier do not respectively match the first password, the first user device identifier, and the first browser identifier beyond the predetermined threshold.

The second system method may include granting the request to access the website for the first user device and performing the one or more actions that include transmitting the first browser identifier mismatch error to the second user device, or transmitting the notification via text or email to the user reporting the browser mismatch, or a combination thereof when the second password matches the first password and the second user device identifier matches the first user device identifier beyond the predetermined threshold, but the second browser identifier does not match the first browser identifier beyond the predetermined threshold. The second system method may include granting the request to access the website for the first user device and performing the one or more actions that include transmitting a user device mismatch error to the second user device, or transmitting the notification via text or email to the user reporting a user device mismatch, or a combination thereof when the second password matches the first password and the second browser identifier matches the first browser identifier beyond the predetermined threshold, but the second user device identifier does not match the first user device identifier beyond the predetermined threshold.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to: portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
one or more processors; and
a memory in communication with the one or more processors and storing instructions that, when executed by the one or more processors, are configured to cause the system to:
receive, from a first browser of a first user device associated with a user, a request to access one or more resources, wherein the request comprises a first salted password, wherein the first salted password comprises a first password, a first user device identifier appended to a first end of the first password, and a first browser identifier appended to a second end of the first user device identifier;
retrieve a stored first password, a stored first user device identifier, and a stored first browser identifier;
extract the first password, the first user device identifier, and the first browser identifier from the first salted password;
respectively compare the first password, the first user device identifier, and the first browser identifier to the stored first password, the stored first user device identifier, and the stored first browser identifier;

determine whether the first password, the first user device identifier, and the first browser identifier respectively match the stored first password, the stored first user device identifier, and the stored first browser identifier beyond a predetermined threshold;

when the first password, the first user device identifier, and the first browser identifier respectively match the stored first password, the stored first user device identifier, and the stored first browser identifier beyond the predetermined threshold, grant the request to access the one or more resources for the first user device; and when the first password, the first user device identifier, or the first browser identifier do not respectively match the stored first password, the stored first user device identifier, or the stored first browser identifier beyond the predetermined threshold, perform one or more actions.

2. The system of claim 1, wherein the memory stores further instructions that, when executed by the one or more processors, are further configured to cause the system to generate and transmit the first password to the user via the first user device.

3. The system of claim 1, wherein the first stored password is received from the first user device during a device registration process and subsequently stored in a database associated with the system.

4. The system of claim 1, wherein performing the one or more actions comprises:
randomly generating a first code comprising numbers;
transmitting the first code to the user via email or text message;
prompting the user to enter a second code via the first browser of the first user device;
receiving a salted code comprising a combination of the second code, a second user device identifier, and a second browser identifier;
extracting the second code, the second user device identifier, and the second browser identifier from the salted code; and
prompting the user for a second password or block further password attempts depending on whether the second code, the second user device identifier, and the second browser identifier respectively match the first code, the stored first user device identifier, and the stored first browser identifier beyond the predetermined threshold.

5. The system of claim 1, wherein the memory stores further instructions that, when executed by the one or more processors, are further configured to cause the system to:
when the first password does not match the stored first password beyond the predetermined threshold, but the first user device identifier and the first browser identifier respectively match the stored first user device identifier and the first browser identifier beyond the predetermined threshold, perform the one or more actions comprising:
deny the request to access the one or more resources for the first user device, transmit a password mismatch error to the first user device, or transmit a notification via text or email to the user reporting a password mismatch, or a combination thereof.

6. The system of claim 5, wherein the memory stores further instructions that, when executed by the one or more processors, are further configured to cause the system to:
when the first password does not match the stored first password beyond the predetermined threshold, the first browser identifier does not match the stored first browser identifier beyond the predetermined threshold, but the first user device identifier matches the stored first user device identifier beyond the predetermined threshold, perform the one or more actions comprising:
deny the request to access the one or more resources for the first user device, block a future access associated with the stored first password, the stored first user device identifier, remotely uninstall a first browser associated with the first browser identifier, record future keystrokes of the first user device, transmit the password mismatch error to the first user device, transmit a first browser identifier mismatch error to the first user device, or transmit the notification via text or email to the user reporting the password mismatch and a browser mismatch, or a combination thereof.

7. The system of claim 6, wherein the memory stores further instructions that, when executed by the one or more processors, are further configured to cause the system to:
when the first password does not match the stored first password beyond the predetermined threshold, the first user device identifier does not match the stored first user device identifier beyond the predetermined threshold, but the first browser identifier matches the stored first browser identifier beyond the predetermined threshold, perform the one or more actions comprising:
deny the request to access the one or more resources for the first user device, block the future access associated with the stored first password, the stored first user device identifier, transmit a password mismatch error to the first user device, transmit a first user device identifier mismatch error to the first user device, or transmit the notification via text or email to the user reporting the password mismatch and a first user device identifier mismatch, or a combination thereof.

8. The system of claim 7, wherein the memory stores further instructions that, when executed by the one or more processors, are further configured to cause the system to:
when the first password, the first user device identifier, and the first browser identifier do not respectively match the stored first password, the stored first user device identifier, and the stored first browser identifier beyond the predetermined threshold, perform the one or more actions comprising:
deny the request to access the one or more resources for the first user device, block the future access associated with the stored first password, the stored first user device identifier, transmit the password mismatch error to the first user device, transmit the first user device identifier mismatch error to the first user device, transmit the first browser identifier mismatch error to the first user device, transmit the notification via text or email to the user reporting the password mismatch, the browser mismatch, and a first user device identifier mismatch, or transmit a message to law enforcement, or a combination thereof.

9. The system of claim 8, wherein the memory stores further instructions that, when executed by the one or more processors, are further configured to cause the system to:
when the first password matches the stored first password beyond the predetermined threshold, the first user device identifier matches the stored first user device identifier beyond the predetermined threshold, but the first browser identifier does not match the stored first browser identifier beyond the predetermined threshold, grant the request to access the one or more resources for the first user device and perform the one or more actions comprising:
　transmit the first browser identifier mismatch error to the first user device, remotely uninstall the first browser associated with the first browser identifier after the user closes the first browser, or transmit the notification via text or email to the user reporting the browser mismatch, or a combination thereof.

10. The system of claim 9, wherein the memory stores further instructions that, when executed by the one or more processors, are further configured to cause the system to:
　when the first password matches the stored first password beyond the predetermined threshold, the first browser identifier matches the stored first browser identifier beyond the predetermined threshold, but the first user device identifier does not match the stored first user device identifier beyond the predetermined threshold, grant the request to access the one or more resources for the first user device and perform the one or more actions comprising:
　　transmit a user device mismatch error to the first user device or transmit the notification via text or email to the user reporting a user device mismatch, or both.

11. The system of claim 8, wherein the memory stores further instructions that, when executed by the one or more processors, are further configured to cause the system to:
　when the first password matches the stored first password beyond the predetermined threshold, the first user device identifier matches the stored first user device identifier beyond the predetermined threshold, but the first browser identifier does not match the stored first browser identifier beyond the predetermined threshold, perform the one or more actions comprising:
　　deny the request to access the one or more resources for the first user device, transmit the first browser identifier mismatch error to the first user device, and remotely uninstall the first browser associated with the first browser identifier.

12. The system of claim 11, wherein the memory stores further instructions that, when executed by the one or more processors, are further configured to cause the system to:
　when the first password matches the stored first password beyond the predetermined threshold, the first browser identifier matches the stored first browser identifier beyond the predetermined threshold, but the first user device identifier does not match the stored first user device identifier beyond the predetermined threshold, perform the one or more actions comprising:
　　deny the request to access the one or more resources for the first user device, block the future access associated with the stored first password, transmit a user device mismatch error to the first user device, transmit the notification via text or email to the user reporting a user device mismatch.

13. A user device, comprising:
　one or more processors; and
　a memory in communication with the one or more processors and storing instructions that, when executed by the one or more processors, are configured to cause the user device to:
　　navigate a first browser to a login page for a website;
　　receive a first password inputted by a user of the user device via the first browser at the website;
　　retrieve a user device identifier and a first browser identifier;
　　generate a first salt by appending the first browser identifier to the user device identifier;
　　apply the first salt to the first password by appending the first salt to an end of the first password to generate a first salted password without displaying an indication to the user device that the first salt was applied to the first password;
　　transmit the first salted password to an authentication system; and
　　gain access to the website when the first password, the first browser identifier, and the user device identifier of the first salted password matches a stored password, a stored first browser identifier, and a stored user device identifier beyond a predetermined threshold.

14. The user device of claim 13, wherein the memory stores further instructions that, when executed by the one or more processors, are further configured to cause the user device to receive an access denial message from the authentication system when the first password, the first browser identifier, and the user device identifier of the first salted password do not match the stored password, the stored first browser identifier, and the stored user device identifier beyond the predetermined threshold.

15. The user device of claim 14, wherein the memory stores further instructions that, when executed by the one or more processors, are further configured to cause the user device to receive a first prompt to enter a first code, via the first browser, that is randomly generated when the first password, the first browser identifier, and the user device identifier of the first salted password do not match the stored password, the stored first browser identifier, and the stored user device identifier beyond the predetermined threshold.

16. The user device of claim 15, wherein the memory stores further instructions that, when executed by the one or more processors, are further configured to cause the user device to:
　receive a second code inputted by the user;
　generate a second salt based on the user device identifier and the first browser identifier;
　apply the second salt to the second code to generate a salted code without displaying an indication to the user device that the second salt was applied to the second code;
　transmit the salted code to the authentication system;
　receive a second prompt to enter a second password when the salted code matches the first code, the stored first browser identifier, and the stored user device identifier beyond the predetermined threshold;
　receive the second password inputted by the user of the user device via the first browser at the website;
　generate a third salt based on the user device identifier and the first browser identifier;
　apply the third salt to the second password to generate a second salted password without displaying an indication to the user device that the first salt was applied to the second password;
　transmit the second salted password to the authentication system; and
　gain access to the website when the second salted password matches the stored password, the stored first browser identifier, and the stored user device identifier beyond the predetermined threshold.

17. A system, comprising:
　one or more processors; and a memory in communication with the one or more processors and storing instructions that, when executed by the one or more processors, are configured to cause the system to:
receive, from a first user device associated with a user, a first salted password associated with a website, wherein the first salted password comprises a first user device identifier, a first browser identifier appended to the first user device identifier, and a first password appended to the first browser identifier;
extract the first password, the first user device identifier, and the first browser identifier from the first salted password;
store the first password, the first user device identifier, and the first browser identifier;
receive, from a second user device associated with a user, a request to access the website comprising a second salted password, wherein the second salted password comprising a second password, a second user device identifier, and a second browser identifier;
extract the second password, the second user device identifier, and the second browser identifier from the second salted password;
retrieve the first password, the first user device identifier, and the first browser identifier;
determine whether the second password, the second user device identifier, and the second browser identifier respectively match the first password, the first user device identifier, and the first browser identifier beyond a predetermined threshold;
when the second password, the second user device identifier, and the second browser identifier respectively match the first password, the first user device identifier, and the first browser identifier beyond the predetermined threshold, grant the request to access the website for the first user device; and
when the second password, the first user device identifier, or the first browser identifier do not respectively match the first password beyond the predetermined threshold, the first user device identifier, or the first browser identifier, perform one or more actions.

18. The system of claim 17, wherein the first password is salted by the first user device without displaying an indication to the first user device that a first salt was applied to the first password.

19. The system of claim 17, wherein the memory stores further instructions that, when executed by the one or more processors, are further configured to cause the system to:
when the second password does not match the first password beyond the predetermined threshold, but the second user device identifier and the second browser identifier respectively match the first user device identifier and the first browser identifier beyond the predetermined threshold, perform the one or more actions comprising deny the request to access the website for the first user device, transmit a password mismatch error to the first user device, or transmit a notification via text or email to the user reporting a password mismatch, or a combination thereof;
when the second password does not match the first password beyond the predetermined threshold, the second browser identifier does not match the first browser identifier beyond the predetermined threshold, but the second user device identifier matches the first user device identifier beyond the predetermined threshold, perform the one or more actions comprising deny the request to access the website for the first user device, block a future access associated with the first password and the first user device identifier, transmit the password mismatch error to the second user device, transmit a first browser identifier mismatch error to the second user device, or transmit the notification via text or email to the user reporting both the password mismatch and a browser mismatch, or a combination thereof;
when the second password does not match the first password beyond the predetermined threshold, the second user device identifier does not match the first user device identifier beyond the predetermined threshold, but the second browser identifier matches the first browser identifier beyond the predetermined threshold, perform the one or more actions comprising deny the request to access the website for the first user device, block the future access associated with the first password, the first user device identifier, transmit a password mismatch error to the first user device, transmit a first user device identifier mismatch error to the first user device, or transmit the notification via text or email to the user reporting both the password mismatch and a first user device identifier mismatch, or a combination thereof; and
when the second password, the second user device identifier, and the second browser identifier do not respectively match the first password, the first user device identifier, and the first browser identifier beyond the predetermined threshold, perform the one or more actions comprising deny the request to access the website for the first user device, block the future access associated with the first password and the first user device identifier, transmit the password mismatch error to the second user device, transmit the first user device identifier mismatch error to the second user device, transmit the first browser identifier mismatch error to the second user device, transmit the notification via text or email to the user reporting the password mismatch, the browser mismatch, and a first user device identifier mismatch, or transmit a message to law enforcement, or a combination thereof.

20. The system of claim 19, wherein the memory stores further instructions that, when executed by the one or more processors, are further configured to cause the system to:
when the second password matches the first password and the second user device identifier matches the first user device identifier beyond the predetermined threshold, but the second browser identifier does not match the first browser identifier beyond the predetermined threshold, grant the request to access the website for the first user device and perform the one or more actions comprising transmit the first browser identifier mismatch error to the second user device, or transmit the notification via text or email to the user reporting the browser mismatch, or a combination thereof; and
when the second password matches the first password and the second browser identifier matches the first browser identifier beyond the predetermined threshold, but the second user device identifier does not match the first user device identifier beyond the predetermined threshold, grant the request to access the website for the second user device and perform the one or more actions comprising transmit a user device mismatch error to the second user device, or transmit the notification via text or email to the user reporting a user device mismatch, or a combination thereof.

\* \* \* \* \*